June 13, 1967      R. J. HENDERSON      3,324,888
THREE-WAY, TWO-POSITION VALVE
Filed Oct. 23, 1964      2 Sheets-Sheet 1
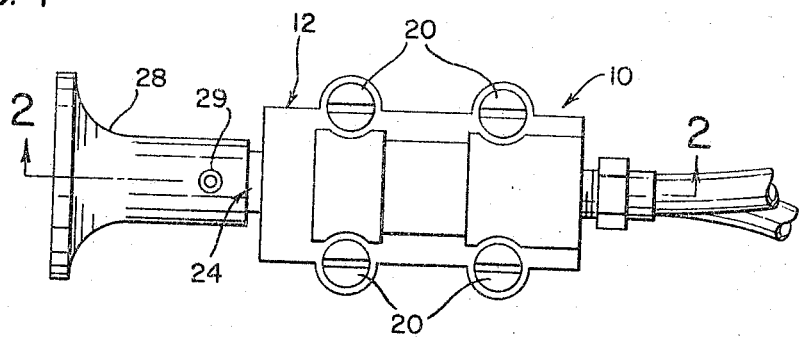
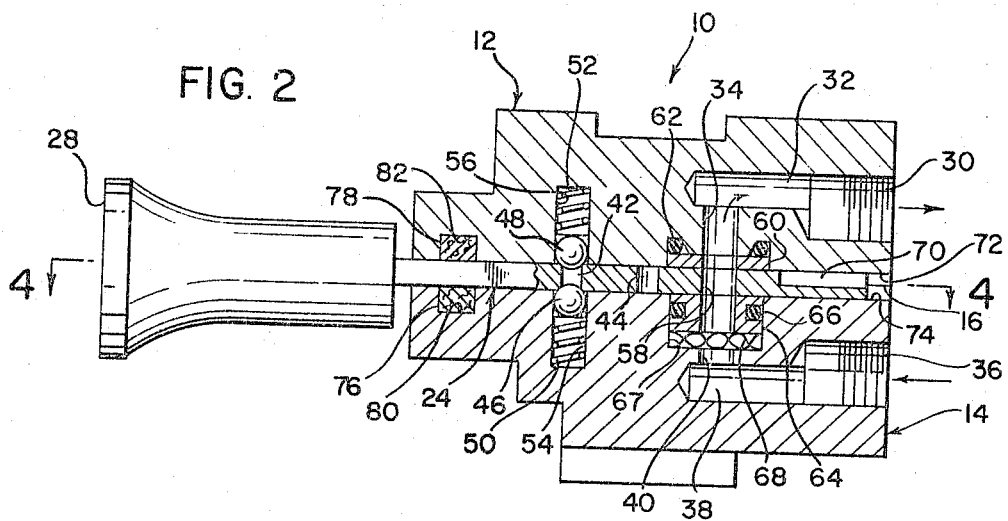
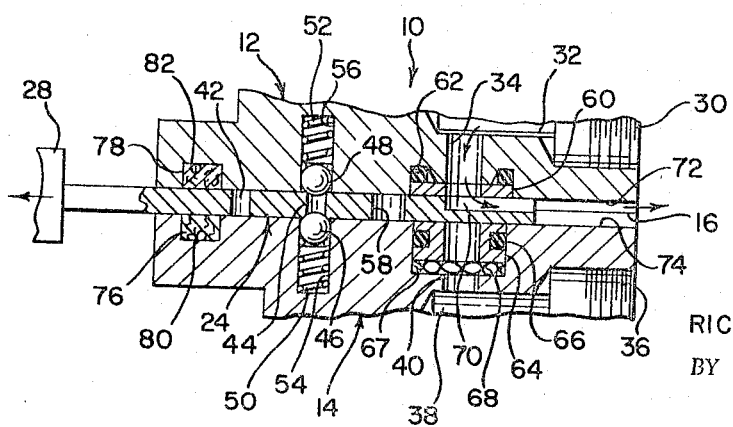
INVENTOR.
RICHARD J. HENDERSON
BY
*Fay & Fay*
ATTORNEYS June 13, 1967 R. J. HENDERSON 3,324,888
THREE-WAY, TWO-POSITION VALVE
Filed Oct. 23, 1964 2 Sheets-Sheet 2

INVENTOR.
RICHARD J. HENDERSON
BY
Fay & Fay
ATTORNEYS

3,324,888
THREE-WAY, TWO-POSITION VALVE
Richard J. Henderson, Avon Lake, Ohio, assignor to Republic Manufacturing Company, Cleveland, Ohio
Filed Oct. 23, 1964, Ser. No. 405,912
12 Claims. (Cl. 137—625.68)

This invention concerns valves in general, and particularly a directional valve adapted for controlling the flow of certain pressurized fluids, such as air. In its broadest sense, the device comprises a valve assembly in which a slide bar member reciprocates to control the direction of flow of pressurized fluid in a fluid system. Suitable sealing means are provided for sealing the valve and the slide bar to insure leak-tight, smooth, and low-friction operation.

In a preferred embodiment of the invention, heat treated, stainless steel annular seals having a fine surface finish are used for sealing the valve's fluid passageways, thereby providing sealing means with high wear resistance and low friction and economical to produce.

A valve incorporating the principles of the invention is compact, and includes threaded means for connecting the valve to fluid lines. Passages of the components comprised in the invention provide a free, continuous, and uninterrupted flow path. Suitable manual actuating means gives a visual indication of the open or closed position of the valve. Stop means limit the reciprocal, longitudinal travel of the slide bar. The valve is comprised of few parts, making its manufacture simple, easy, and economical.

Directional valves are not new in themselves and many variations are known. However, the known valves of this type have serious drawbacks. Some do not provide adequate sealing with low-friction operation. Furthermore, they do not combine simple structure with easy and economical manufacture. Valves that have acceptable low-friction operating characteristics and require low actuating forces have not overcome the problem of adequate and acceptable sealing. Conversely, valves that have acceptable sealing characteristics require high actuating forces. Furthermore, the sealing arrangements in many valves are often complicated and unsatisfactory. The use of elastomeric seals alone is undesirable because these seals often tend to pinch, extrude, or grab, resulting in a limited seal life and early failure of the valve. Non-elastomeric seals often tend to wear rapidly, galling or scoring some of the cooperating component parts, again resulting in premature valve failure.

With the foregoing problems in mind, it is the general object of this invention to provide an improved directional valve to control the flow of pressure fluids; a valve that is simple, efficient, easy to operate, and economical to manufacture.

It is a more specific object of this invention to provide a valve structure that has heat-treated, lapped, metallic seals to insure leak-tight, low-friction operation between moving members.

It is a further object of this invention to provide a simple valve structure with an uninterrupted and continuous flow path in one position, and a blocked and perfectly sealed flow path in another position.

It is a further object of this invention to provide a valve structure in which elastomeric seals, used in combination with the metallic seals, are kept from extruding or pinching, wherein said elastomeric seals are in effect static seals, greatly reducing the wear of the elastomeric seals and increasing the life of the valve.

It is a further object of this invention to provide a valve structure with a slide bar in which the sealing components and the sliding member are pressure loaded substantially to reduce wear and the forces required to actuate the sliding member.

Other and more specific objects of the invention will become more apparent from the detailed description that follows.

The invention comprises a valve assembly having two cooperating valve body members which form an internal opening that receives a reciprocating slide bar member. Part of the slide bar projects outside the valve assembly where it is fastened to an actuating knob.

When the slide bar is pushed fully into the valve, a porthole in the slide bar is aligned with the fluid passageway in the valve. When the slide bar is pulled fully out of the valve, a venting slot on one face of the slide bar aligns with the fluid passageway on that side of the valve; however, the opposite side of the slide bar blocks and seals the passageway in the opposite side of the valve, thus blocking all flow on said side of the valve.

The seals between the valve bodies and slide bar are substantially annular in shape and made of a metallic material that is lapped to a fine surface finish. The openings through the centers of the metallic seals are large enough to prevent any interference or restriction to fluid flow.

In the valve structure of the invention, the slide bar may be of rectangular cross section as shown. It may also be square, cylindrical, conical, barrel-shaped, or any combination thereof so the slide bar can interconnect or completely block the flow of fluid through the passageways.

In the drawings:

FIG. 1 is a plan view of the valve structure of the invention;

FIG. 2 is a longitudinal section along the line 2—2 of FIG. 1 with the slide bar shown in the fully pushed-in position;

FIG. 3 is a fragmentary portion of the view illustrated in FIG. 2 with the slide bar in the fully pulled-out position;

Referring now more particularly to the drawings, where like numerals are used throughout for like parts in several views:

Figure 4:
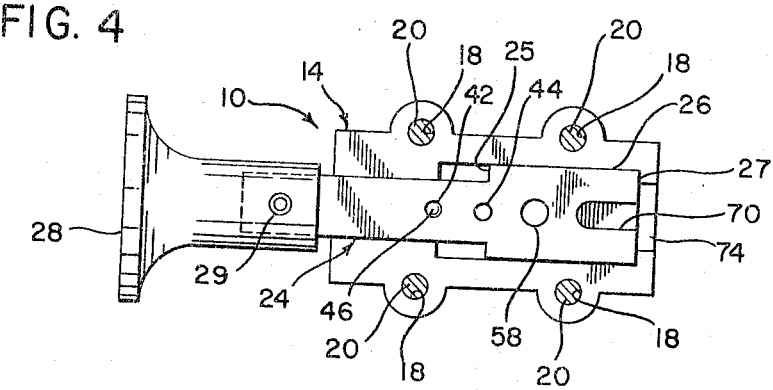
FIG. 4 is a partial, longitudinal section along line 4—4 of FIG. 2.
Figure 5:
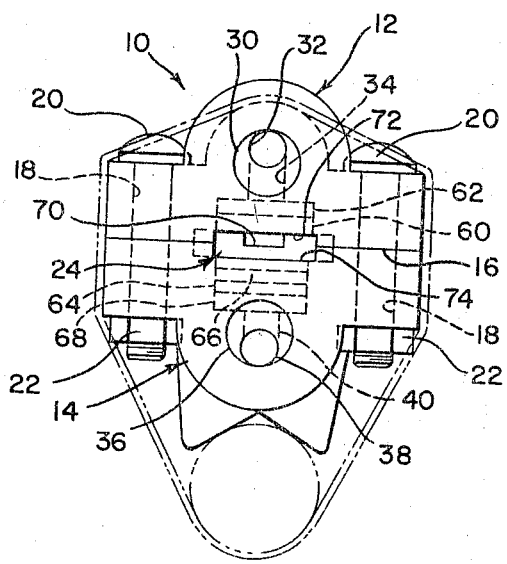
FIG. 5 is an end view of the valve showing in phantom lines means to attach the valve to some cylindrical member.
Figure 6:
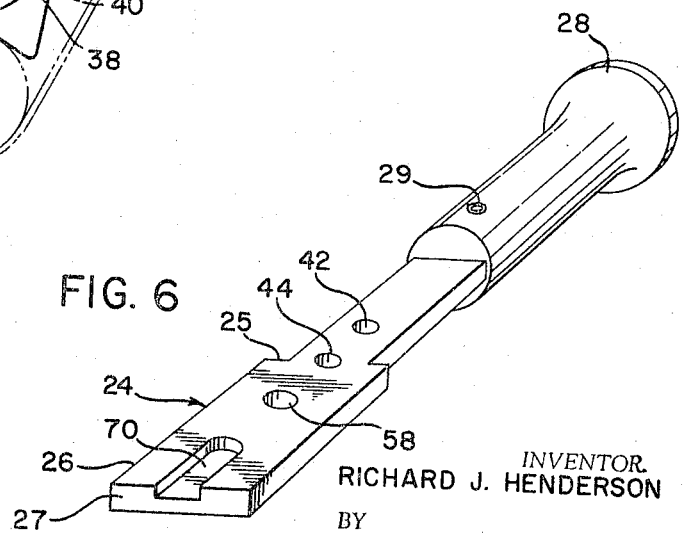
FIG. 6 is a perspective view of the valve slide bar.

In the illustrated, preferred embodiment of the invention, the numeral 10 designates generally a valve structure embodying the principles of this invention and comprises in general an upper body 12 and a lower body 14 secured in face-to-face engagement along a plane 16 by bores 18, bolts 20 disposed therethrough, and held in place by nuts 22. When the upper and lower valve body portions 12 and 14 are in face-to-face engagement, they form an internal space that receives a slide bar 24 which is in a sliding manner between said valve body portions. Slide bar 24 is substantially rectangular in cross section, being stepped to a larger width dimension 26 but having the same thickness. The larger portion of the slide bar 24 provides internal stops 25 and 27. At the end protruding outside the valve, the slide bar is fastened to a knob 28 by means of a roll pin 29. The upper valve body 12 has a fluid passageway comprised of threaded means 30, and passages 32 and 34. The lower valve body has a fluid passageway comprised of threaded means 36, and passages 38 and 40.

Slide bar 24 has two detent holes 42 and 44 that cooperate with two detent balls 46 and 48 that oppose each other directly on either side of the slide bar, said balls being urged toward each other by springs 50 and 52, respectively. Springs 50 and 52 fit into spring wells 54 and 56, respectively, and are strong enough to keep the detent balls 46 and 48 engaged in either of detent holes 42 or 44. When the slide bar is pushed all the way in (FIG. 2), then pulled to the left, the detent balls 46 and 48 compress their respective springs until the detent balls ride out of the detent hole 42. As the slide bar continues to move to the left, detent hole 44 aligns with the detent balls which snap into detent hole 44 locking the slide bar in its new position (FIG. 3). Likewise, when the slide bar is pushed to the right (FIG. 3), the action of the detent balls 46 and 48 and springs 50 and 52 is much the same, allowing the balls to ride out of detent hole 44, then snap into detent hole 42 (FIG. 2). Enlarged portion 26 of the slide bar has a connecting port 58 that interconnects the fluid passageways in valve bodies 12 and 14. The diameter of connecting port 58 is substantially the same or slightly larger than passages 34 and 40 to prevent any obstruction or interference in fluid flow.

Connecting port 58 in the slide bar and passageway 34 in the upper body 12 are sealed by an annular, metallic seal 60 backed up by O-ring 62. The O-ring 62 urges seal 60 against the mating side of slide bar 24 effectively sealing the passageway from port 58 to passage 34. In the lower valve body 14, connecting port 58 and passageway 40 are sealed by an annular, metallic seal 64. Seal 64 has a groove along its periphery receiving O-ring 66 which seals the bore 67, holding seal 64. Seal 64 is backed by a spring washer 68 at the bottom of bore 67, said spring washer urging seal 64 against the mating side of slide bar 24 effectively sealing the passageway from port 58 to passage 40. The diameters of the holes through the centers of annular seals 60 and 64 are the same size or slightly larger than passages 34 and 40 to prevent any obstruction or interference in fluid flow.

In the valve position shown in FIG. 2, when the valve is connected to a source of pressure fluid, such as compressed air, the pressurized air flows through passages 38 and 40 in the lower valve body 14, then through the sealed connecting port 58, through passages 34 and 32 in the upper valve body 12 and on to the component being pressurized. Seals 60 and 64 prevent any pressure fluid from escaping or leaking out.

When actuating knob 28 is pulled to the left (FIG. 3), it shifts the slide bar to its alternate detented position. A longitudinal venting slot 70 in portion 26 of the slide bar moves in line with the hole in the center of the annular metallic seal 60 and passage 34 in upper valve body 12. This creates a continuous flow path from the component being controlled to atmosphere through port 30, passages 32 and 34, the hole in the center of seal 60, venting slot 70 and openings 72 and 74 in valve bodies 12 and 14, respectively. This allows any air trapped in the component and connecting lines to escape the atmosphere. At the same time, on the opposite side of the slide bar 24, pressure air entering the valve through 36 is blocked against the backside of the slide bar and effectively kept from escaping by the annular metallic seal 64 and O-ring 66. Wipers 76 and 78 in grooves 80 and 82, respectively, wipe slide bar 24, preventing contaminants from entering the valve assembly.

For ease of description, the principles of the invention have been set forth in detail in connection with a single, illustrated embodiment. It is not the inventor's intention that the illustrated embodiment nor the terminology employed in describing the invention be limiting inasmuch as variations in these may be made without departing from the spirit of the invention. Rather, the inventor desires to be restricted only by the scope of the appended claims.

The invention claimed is:
1. A valve comprising in combination:
 (a) a valve body having a slide chamber, first and second ports communicating with an intermediate portion of said chamber, and a third port communicating with said chamber adjacent one end thereof;
 (b) an axially reciprocal slide having a first portion confined in said chamber and a second portion extending from the end of said chamber opposite to said one end;
 (c) said first slide portion having first and second opposed flat faces, a slot formed in said first face, said slot extending longitudinally of said slide from one end thereof and terminating short of said second slide portion, and a through passage ported on said opposed slide faces, said passage being spaced from said slot and located between said slot and said second slide portion;
 (d) and first and second seals mounted in said valve body, each of said seals having an end portion in sliding engagement with a different one of said slide faces and a fluid passage therethrough, said passages of said first and second seals being in open communication with said first and second ports, respectively;
 (e) said slide being reciprocal between a first position in which said through slide passage communicates said first and second ports, and a second position in which said first port is communicated via said longitudinally extending slot with said third port.

2. The structure of claim 1 in which the slide is stepped longitudinally between said first and second portions, said first portion of said slide within said chamber being wider than said second portion of said slide.

3. A valve as claimed in claim 1 wherein said slide and said valve body include cooperating detent means operable to hold said slide in each of said first and second positions, said detent means comprising a pair of holes spaced apart a distance equal to the amount of slide travel between said first and second positions, and means releasably engageable in said holes to retain said slide in each position.

4. The structure of claim 1 in which the seals in the valve body are mounted on either side of the slide and are metallic.

5. The structure of claim 4 in which the seals are pressure loaded against said slide faces.

6. The structure of claim 4 in which one of said seals is backed by a resilient sealing member.

7. The structure of claim 6 in which the other of said seals is backed by a resilient washer.

8. A valve as claimed in claim 1 wherein said one end of said chamber is open on one end of said valve body to define said third port, said one end of said slide being spaced from said one end of said chamber in said second slide position.

9. The structure of claim 8 in which said releasably engaging means are balls.

10. A valve as claimed in claim 8 wherein said valve body comprises a pair of members secured together in face-to-face mating engagement along a common plane, said valve body members cooperating to form an internal space which extends from said one end of said valve body to the opposite end, and said slide being received in said space.

11. A valve as claimed in claim 10 wherein said first port is formed in one of said valve body members and is located on said one end of said valve body, and wherein said second port is formed in the other of said valve body members and is located on said one end of said valve body.

12. A valve as claimed in claim 10 including wiper means carried by said valve body members in engagement with said slide for preventing contaminants from entering said chamber when said slide is moved.

References Cited

UNITED STATES PATENTS

| | | | |
|---|---|---|---|
| 2,394,487 | 2/1946 | Rotter et al. | 137—625.68 XR |
| 2,858,851 | 11/1958 | Holl | 251—174 XR |
| 2,868,497 | 1/1959 | Graham | 251—174 XR |
| 2,998,828 | 9/1961 | Hare | 137—625.68 |
| 3,095,004 | 6/1963 | Jackson et al. | 251—174 XR |
| 3,150,517 | 9/1964 | Kuffer et al. | 137—625.18 XR |

M. CARY NELSON, *Primary Examiner.*

H. KLINKSIEK, *Assistant Examiner.*